P. WENDT.
OIL TESTING MACHINE.
APPLICATION FILED APR. 1, 1911.

1,044,317.

Patented Nov. 12, 1912.

2 SHEETS—SHEET 1.

Witnesses.
Corinne Myers
Vera Paulsen

Inventor:
Paul Wendt.
by L. K. Böhm,
Attorney.

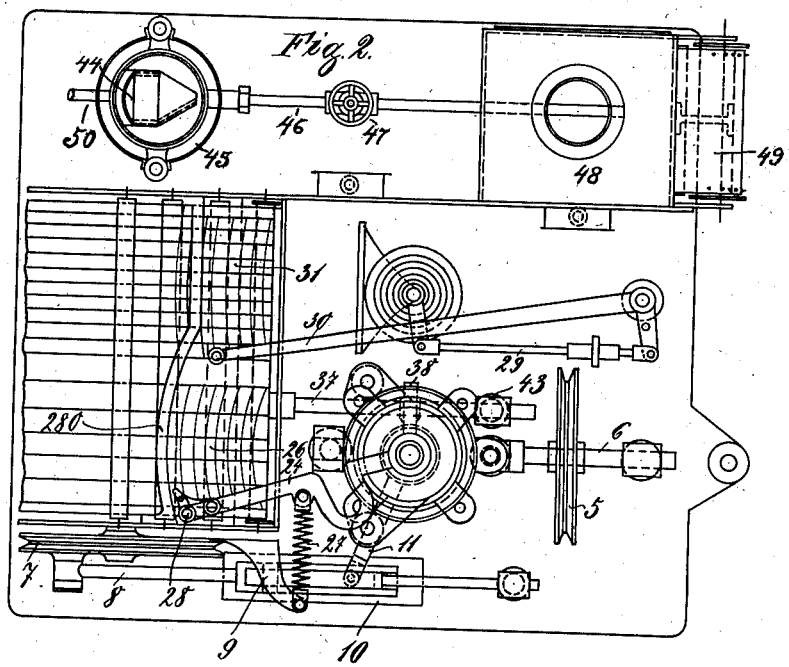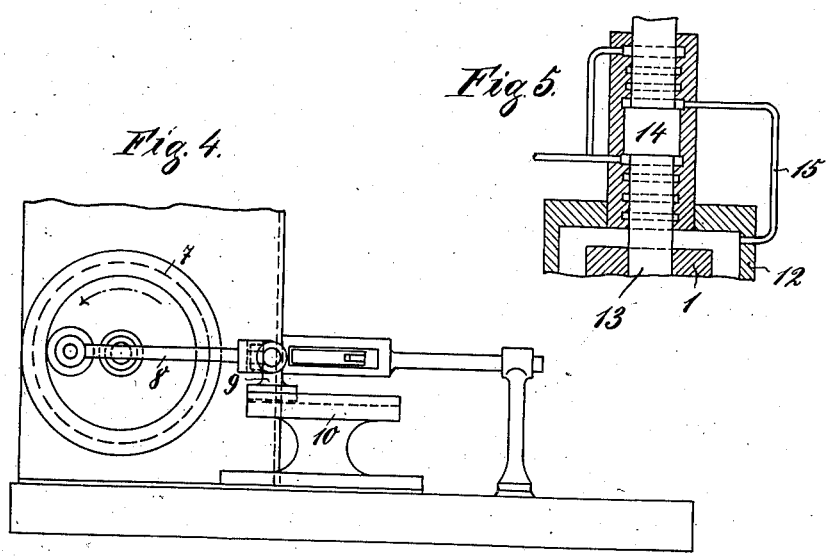

UNITED STATES PATENT OFFICE.

PAUL WENDT, OF HAMBURG, GERMANY, ASSIGNOR TO COMPANY "OELWERKE STERN-SONNEBORN AKTIENGESELLSCHAFT," OF HAMBURG, GERMANY.

OIL-TESTING MACHINE.

1,044,317.

Specification of Letters Patent.   Patented Nov. 12, 1912.

Application filed April 1, 1911.   Serial No. 618,267.

*To all whom it may concern:*

Be it known that I, PAUL WENDT, a citizen of the free town of Lübeck, and resident of No. 4 Hinter den Hoefen, in the free town of Hamburg, German Empire, have invented a new and useful Oil-Testing Machine, of which the following is a specification.

This invention relates to machines for testing oils and consistent fats as to their lubricating properties, of the type in which the friction of the oil or fat between a rotatable driven member and a loose member causes the latter to rotate with the driven member.

The object of the present invention is to enable the apparatus to be used for testing during oscillatory rotation of the friction members as well as during the here-to-fore usual continuous rotary motion.

In order that the invention may be clearly understood reference is made to the accompanying drawings, whereon is shown the preferred method of carrying out the invention.

Figure 1:
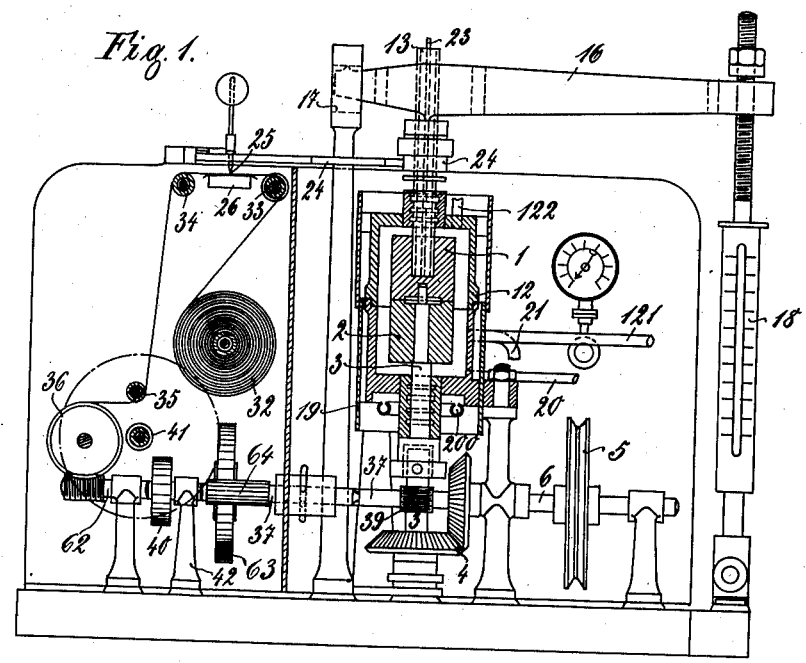
Figure 3:
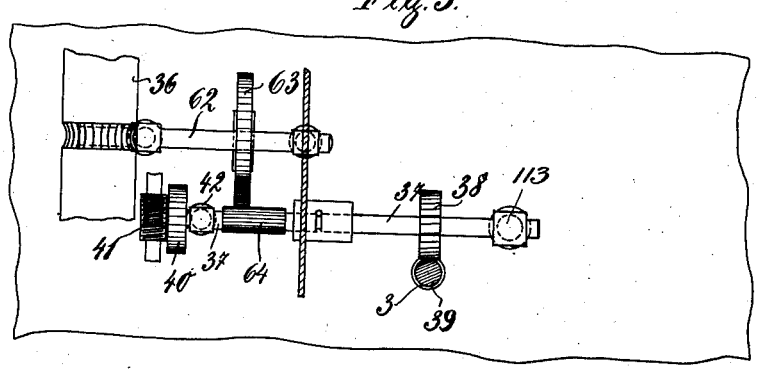

Figure 1 is a side view of the oil testing machine, part being shown in section, Fig. 2 is a plan view of Fig. 1, Fig. 3 is a detail plan view of the driving gear, Fig. 4 is a detail view showing the gear for oscillating the lower friction member, Fig. 5 is a detail view which will be hereinafter fully referred to.

Referring to Figs. 1 and 2 of the drawings, the machine comprises two friction members 1 and 2 having annular surfaces between which lubricating oil or fat is fed in any suitable manner, the friction member 2 being mounted upon a vertical spindle 3 which can be driven by means of bevel gearing 4 from a spindle 6 upon which is mounted a rope-pulley 5 driven from any suitable source of power, the spindle 3 being thus caused to continuously rotate. Means however are provided whereby the spindle 3 can be caused to oscillate and for this purpose a rope-pulley 7, see Figs. 2 and 4, driven from a suitable source of power reciprocates a cross-head 9 in a slide-block 10 through a connecting rod 8, the cross-head 9 being articulated to a lever 11 which is secured on the spindle 3, so that during the continuous rotation of the rope-pulley 7 the spindle 3 is given an oscillatory movement over a predetermined angle. The friction members 1 and 2 are surrounded by a closed, divided casing 12 provided with steam-inlet and outlet connections 121 and 122 respectively. The upper friction member 1 is mounted upon a vertical rod 13 which, as shown in Fig. 5, passes through a suitable gland on the casing 12. The rod 13 is formed with an enlarged part 14 forming a piston and in order that the pressure on both sides of the piston may be equal, a steam pipe 15 connects the interior of the casing 12 with a small annular chamber above the piston 14.

The rod 13 is loaded by means of a lever 16 fulcrumed at one end within a post 17 and loaded at the other end by means of a variable load 18 which on the drawings is shown as comprising a spring balance. Surrounding the casing 12 is a jacket 19 and means are provided for cooling the lower friction member 2 if desired; for this purpose a pipe 20 leads to the interior of the casing 12 and an over-flow pipe 21 is provided. The pipe 20 can also be used as a run-off pipe for condensed steam. A Bunsen burner 200 enables the casing 12 to be heated to any desired temperature.

The testing machine is also provided with a spiral spring thermometer 22, the thermometer tube 23 leading therefrom through the rod 13 to the space between the friction members 1 and 2, so that by this means the temperature at the point of friction can be determined. The rod 13 is connected by means of a lever 24 with a style or pencil 25 working over a recording arrangement 26. Connected to the lever 24 is a spring 27 which is tensioned by the movement of the lever. A pawl 28 is carried by the lever 24, this pawl engaging an arcuate ratchet-toothed rack 280, whereby a return movement of the lever 24 is prevented, until released by the disengagement of the pawl 28 from the rack 280.

The thermometer 22 is connected with a style or pencil carried by a lever 30 by means of a connecting rod 29, the style or pencil on the lever 30 working over a recording device 31. The recording strips of the arrangements 26—31 are moved simultaneously and uniformly by mechanism actuating the mechanism for driving the testing means but, if desired, both records may be made on one broad recording strip.

The recording strip is fed from a roller 32 and passes over guide rolls 33, 34 and 35 to the winding-up roller 36. The roller 36 is driven by worm and worm-wheel gearing from a spindle 62 having a gear wheel 63 gearing with an elongated pinion 64 on a spindle 37 driven from the spindle 3 by means of a worm-wheel 38 gearing with a worm 39 on the spindle 3, whereby the winding-up roller 36 is continuously rotated in one direction, so long as the spindle 3 is continuously rotated from the rope-pulley 5. If, however, the spindle 3 is given an oscillatory movement from the rope-pulley 7, the spindle 37 is shifted so that the worm-wheel 38 is out of engagement with the worm 39, while a worm-wheel 40 on the spindle 37 comes into engagement with a worm 41 on the driving spindle of the rope-pulley 7. For this purpose the spindle 37 is adjustably mounted in bearing 42, 43.

The method of operation of the fore-going arrangement is as follows: When the rope-pulley 5 is put in gear with the spindle 3, the testing of the lubricating oil between the friction members 1 and 2 under continuous rotation of the member 2 can take place. Owing to friction the friction member 1 is caused to rotate with the member 2 more or less and through the lever 24 mounted on the rod 30 of the friction member 1, against the action of the spring 27, the recording instrument 26 describes a curve upon the corresponding recording strip. The upper member 1 will be rotated more or less with the member 2 according to the nature of the lubricating oil or fat under test.

If the spindle 37 is shifted in the manner hereinbefore described, so as to throw the rope-pulley 5 out of gear and put the rope-pulley 7 in gear with the spindle 3, an oscillatory movement is given to the friction member 2 and the properties of the lubricating oil or the like can thus be tested under oscillatory movement, the upper member 1 being rotated more or less according to the friction between the members 1 and 2 and return movement of the member 1 being prevented by means of the pawl 28 engaging the rack 280. By this means the oil can be tested according to the requirements of practice both during continuous rotation and oscillatory movement, while at the same time no alteration is required in the testing members 1 and 2. The load is effected by means of a variable load on the rod 13, so that thereby the oil can be tested under different loads without alterations being required in the friction members and without the possibility of axial or transverse movements of the rod 13, the latter having only a rotary movement, so that an efficient joint between the rod 13 and the casing 12 is maintained. The oil or fat may not only be tested under mechanical load, but also, if desired under the pressure of steam or the like which may be inclosed in the interior of the casing 12 or caused to pass through the same. Tests may also be carried out while the lower member is cooled which can be effected by admitting cold water to the interior of the casing 12 by way of the tube 20, the water running off by way of the overflow pipe 21, this being of importance if the tests are to be carried out at a constant temperature.

By the means hereinbefore described, it is not only possible to ascertain the friction and durability of the oil or the like under different conditions, but at the same time the heat generated or the increase in temperature can be determined, which is a very important test in estimating the value of the lubricant and this can be carried out uniformly with the recording of the mechanical properties of the lubricant, as the recording strips are traversed uniformly and simultaneously. Furthermore by the improved apparatus the temperature can be determined at the point where friction actually takes place. Thus it will be seen that the amount of friction, the durability and the heat generated or the increase in temperature can be continuously and automatically recorded on a common recording strip.

Fig. 2 also shows an apparatus for testing oils or fats in contact with steam, the oil being supplied to a pan 44 inclosed in a container 45 to which steam is admitted by way of a pipe 50, the mixture of oil and steam passing out through a tube 46 and control valve 47 into a box 48 within which it is sprayed onto a recording strip 49 passing through the box. It is however to be understood that this testing apparatus forms no part of the present invention.

I claim:

1. In a machine for testing oil and fat, a driven friction member, a loosely mounted friction member, said members having juxtaposed surfaces separated by the material under test and said driven member transmitting motion to said loose member, driving means for giving a rotary motion to said driven member, and driving means for alternatively giving an oscillatory motion to said driven member.

2. In a machine for testing oil and fat, a driven friction member, a loosely mounted friction member, said members having juxtaposed surfaces separated by the material under test, a spindle carrying said driven member, driving gear for transmitting rotary motion to said spindle and driven member, an arm fixed upon and projecting from said spindle, and independent driving gear for oscillating said arm so as to oscillate the driven member.

3. In a machine for testing oil and fat, a driven friction member, a loosely mounted friction member, said members having juxtaposed surfaces separated by the material under test and said driven member transmitting motion to said loose member, driving means for giving a rotary motion to said driven member, driving means for alternatively giving an oscillatory motion to said driven member, a recording strip, recording means actuated by said loose member for recording on said strip and means for resisting the motion of the said recording means.

4. In a machine for testing oil and fat, a driven friction member, a loosely mounted friction member, said members having juxtaposed surfaces separated by the material under test and said driven member transmitting motion to said loose member, driving means for giving a rotary motion to said driven member, driving means for alternatively giving an oscillatory motion to said driven member, a continuous recording strip, recording means actuated by said loose member for recording on said strip, means for resisting the motion of said recording means, a take-up roll for said strip and means for transmitting continuous rotation to said roll by one or other of said driving means.

5. In a machine for testing oil and fat, a driven friction member, a loosely mounted friction member, said members having juxtaposed surfaces separated by the material under test, a spindle carrying said driven member, driving gear for transmitting rotary motion to said spindle and driven member, an arm fixed upon and projecting from said spindle, independent driving gear for oscillating said arm so as to oscillate the driven member, a continuous recording strip, recording means actuated by said loose member for recording on said strip, a take-up roll for said strip, means for resisting the motion of said recording means and a spindle adapted to drive said take-up roll and adapted to be put into gear with one or other of said driving gears by sliding said spindle.

6. In a machine for testing oil and fat, a driven friction member, a loosely mounted friction member, said members having juxtaposed surfaces separated by the material under test and said driven member transmitting motion to said loose member, driving means for giving a rotary motion to said driven member, driving means for alternatively giving an oscillatory motion to said driven member, means for applying a variable load to said loosely mounted member, a recording strip, recording means actuated by said loose member for recording on said strip and means for resisting the motion of said recording means.

7. In a machine for testing oil and fat, a driven friction member, a loosely mounted friction member carried by a spindle, said member having juxtaposed surfaces separated by the material under test said driven member transmitting motion to said loose member, driving means for giving a rotary motion to said driven member, driving means for alternatively giving an oscillatory motion to said driven member, a lever fulcrumed at one end and bearing at a point in its length on the spindle of said loose member, and means for applying a variable load to the free end of said lever.

8. In a machine for testing oil and fat, a driven friction member, a loosely mounted friction member, said members having juxtaposed surfaces separated by the material under test and said driven member transmitting motion to said loose member, driving means for giving a rotary motion to said driven member, driving means for alternatively giving an oscillatory motion to said driven member, and a thermometer, the tube of said thermometer leading to the space between the juxtaposed surfaces of said members.

9. In a machine for testing oil and fat, a driven friction member, a loosely mounted friction member, said members having juxtaposed surfaces separated by the material under test and said driven member transmitting motion to said loose member, driving means for giving a rotary motion to said driven member, driving means for alternatively giving an oscillatory motion to said driven member, a recording strip, recording means actuated by said loose member for recording its motions on said strip, means for resisting the motion of said recording means, a thermometer the tube of which leads to the space between the juxtaposed surfaces of said member and a recording device controlled by said thermometer and adapted to record on said recording strip.

10. In a machine for testing oil and fat, a driven friction member, a loosely mounted friction member, said members having juxtaposed surfaces separated by the material under test and said driven member transmitting motion to said loose member, driving means for giving a rotary motion to said driven member, driving means for alternatively giving an oscillatory motion to said driven member, a recording strip, recording means actuated by said loose member for recording its motions on said strip, means for resisting the motion of said recording means, a thermometer the tube of which leads to the space between the juxtaposed surfaces of said member, a second recording strip and a recording device actuated by said thermometer and adapted to record on said second recording strip.

11. In a machine for testing oil and fat, a driven friction member, a loosely mounted friction member, said members having juxtaposed surfaces separated by the material under test and said driven members transmitting motion to said loose member, driving means for giving a rotary motion to said driven member, driving means for alternatively giving an oscillatory motion to said driven member, a continuous recording strip, recording means actuated by said loose member for recording its motion on said continuous strip, means for resisting the motion of said recording means, a thermometer the tube of which leads to the space between the juxtaposed surfaces of said member, a recording device controlled by said thermometer and adapted to record on said recording strip, a take-up roll for said continuous strip, and means for transmitting continuous rotary motion to said take-up roll by one or other of said driving means.

12. In a machine for testing oil and fat, a driven friction member, a loosely mounted friction member, said members having juxtaposed surfaces separated by the material under test and said driven member, transmitting motion to said loose member, driving means for giving a rotary motion to said driven member, driving means for alternatively giving an oscillatory motion to said driven member, a continuous recording strip, recording means actuated by said loose member for recording its motions on said continuous strip, means for resisting the motion of said recording means, a thermometer the tube of which leads to the space between the juxtaposed surfaces of said member, a second continuous recording strip, a recording device actuated by the thermometer and adapted to record on said second continuous recording strip, a take-up roll for said continuous strips, and means for transmitting continuous rotary motion to said take-up roll by one or other of said driving means, so as to traverse said continuous strips uniformly and simultaneously.

In witness whereof I have hereunto set my hand in the presence of two witnesses.

PAUL WENDT.

Witnesses.
ERNST SCHUBERT,
HUGO RHEINGANS.